US009650053B2

(12) United States Patent
Singh et al.

(10) Patent No.: US 9,650,053 B2
(45) Date of Patent: May 16, 2017

(54) SLIP RATIO POINT OPTIMIZATION SYSTEM AND METHOD FOR VEHICLE CONTROL

(71) Applicant: The Goodyear Tire & Rubber Company, Akron, OH (US)

(72) Inventors: Kanwar Bharat Singh, Stow, OH (US); Srikanth Veppathur Sivaramakrishnan, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/558,764

(22) Filed: Dec. 3, 2014

(65) Prior Publication Data

US 2016/0159367 A1 Jun. 9, 2016

(51) Int. Cl.
| | | |
|---|---|---|
| *B60C 23/00* | (2006.01) | |
| *B60W 40/10* | (2012.01) | |
| *G07C 5/08* | (2006.01) | |
| *B60T 8/172* | (2006.01) | |
| *B60C 23/04* | (2006.01) | |
| *B60C 11/24* | (2006.01) | |

(52) U.S. Cl.
CPC ........... *B60W 40/10* (2013.01); *B60T 8/1725* (2013.01); *G07C 5/0808* (2013.01); *B60C 11/246* (2013.04); *B60C 23/0493* (2013.01); *B60T 2240/03* (2013.01); *B60W 2400/00* (2013.01)

(58) Field of Classification Search
USPC .... 73/8, 146.2; 701/80, 33.7, 32.9, 34.4, 36; 340/440; 303/148–150; 152/209.1, 152/209.15
See application file for complete search history.

(56) References Cited

U.S. PATENT DOCUMENTS

| | | | |
|---|---|---|---|
| 6,539,295 B1 | 3/2003 | Katzen et al. | |
| 6,637,276 B2 | 10/2003 | Adderton et al. | |
| 6,697,726 B2 | 2/2004 | Takagi et al. | |
| 6,820,597 B1 * | 11/2004 | Cullen | F02D 17/02 123/516 |
| 6,962,075 B2 | 11/2005 | Bertrand | |

(Continued)

FOREIGN PATENT DOCUMENTS

| | | |
|---|---|---|
| CN | 103112365 | 5/2013 |
| DE | 19716586 C1 | 8/1998 |

(Continued)

OTHER PUBLICATIONS

A Vehicle Roll-Stability Indicator Incorporating Roll-Center Movements; Jongchul Jung; Taehyun Shim; Gertsch, J.; Vehicular Technology, IEEE Transactions on; Year: 2009, vol. 58, Issue: 8; pp. 4078-4087, DOI: 10.1109/TVT.2009.2021420.*

(Continued)

*Primary Examiner* — Cuong H Nguyen
(74) *Attorney, Agent, or Firm* — Edward T. Kennedy

(57) ABSTRACT

An optimal tire slip ratio estimation system and method affixes a tire-identification device to a vehicle tire to provide a tire-specific identification and one or more sensors affixed to the tire for measuring one or more tire-specific parameters. A model-based optimal slip ratio estimator generates a model-derived optimal tire slip ratio estimation based upon an assessment of sensor-derived tire-specific parameter information based on the tire-specific identification.

8 Claims, 15 Drawing Sheets

(56) References Cited

U.S. PATENT DOCUMENTS

| | | | |
|---|---|---|---|
| 7,069,135 B2* | 6/2006 | Bertrand | B60T 8/1725 303/148 |
| 7,073,322 B2* | 7/2006 | Sumilla | F02D 41/0082 123/443 |
| 7,099,765 B2* | 8/2006 | Bertrand | B60T 8/1725 303/149 |
| 7,130,735 B2 | 10/2006 | Brown et al. | |
| 7,404,317 B2 | 7/2008 | Mancosu et al. | |
| 7,546,764 B2 | 6/2009 | Morinaga | |
| 7,552,628 B2 | 6/2009 | Mancosu | |
| 7,912,683 B2* | 3/2011 | Miyashita | B60W 40/12 152/209.1 |
| 9,187,099 B2* | 11/2015 | Powers | B60W 40/06 |
| 9,259,976 B2* | 2/2016 | Singh | B60C 11/246 |
| 2002/0059023 A1 | 5/2002 | Takagi et al. | |
| 2003/0074127 A1* | 4/2003 | Kin et al. | 701/80 |
| 2003/0236603 A1 | 12/2003 | Lu | |
| 2004/0199314 A1 | 10/2004 | Meyers et al. | |
| 2004/0254707 A1 | 12/2004 | Lu et al. | |
| 2005/0033486 A1 | 2/2005 | Schmitt et al. | |
| 2005/0072223 A1 | 4/2005 | Fennel et al. | |
| 2005/0085987 A1* | 4/2005 | Yokota | B60C 23/0477 701/80 |
| 2005/0150283 A1 | 7/2005 | Shick | |
| 2005/0177296 A1 | 8/2005 | Brown et al. | |
| 2006/0156790 A1* | 7/2006 | Bocquillon | B60C 11/24 73/8 |
| 2006/0267750 A1* | 11/2006 | Lu et al. | 340/440 |
| 2007/0010928 A1 | 1/2007 | Brusarosco et al. | |
| 2007/0017727 A1 | 1/2007 | Messih et al. | |
| 2007/0233352 A1* | 10/2007 | Miyashita | B60W 40/12 701/82 |
| 2008/0103659 A1 | 5/2008 | Mancosu | |
| 2009/0055040 A1 | 2/2009 | Nagaya | |
| 2009/0186535 A1* | 7/2009 | Sullivan | 440/6 |
| 2010/0060443 A1* | 3/2010 | Wakao | B60C 11/246 340/444 |
| 2010/0063671 A1 | 3/2010 | Fink et al. | |
| 2010/0114449 A1* | 5/2010 | Shiozawa | B60L 3/10 701/90 |
| 2011/0060500 A1 | 3/2011 | Irth et al. | |
| 2011/0199201 A1 | 8/2011 | Brusarosco et al. | |
| 2013/0151075 A1 | 6/2013 | Moshchuk et al. | |
| 2013/0211621 A1 | 8/2013 | Breuer et al. | |
| 2015/0057877 A1* | 2/2015 | Singh | B60C 11/246 701/34.4 |
| 2016/0137208 A1* | 5/2016 | Powers | B60W 40/06 701/36 |

FOREIGN PATENT DOCUMENTS

| | | | |
|---|---|---|---|
| DE | 10320828 | 12/2004 | |
| DE | 102008046269 | 12/2009 | |
| EP | 2301769 A1 | 3/2011 | |
| EP | 2385914 A2 * | 11/2011 | ......... B60C 23/0493 |
| EP | 2172760 A4 | 8/2012 | |
| EP | 2927066 A1 | 10/2015 | |
| WO | WO2011054363 A1 | 5/2011 | |

OTHER PUBLICATIONS

Semi-parametric adaptive control of discrete-time nonlinear systems; Chenguang Yang; Tianyou Chai; Lianfei Zhai; Ge, S.S.; Tong Heng Lee; Automation and Logistics, 2009. ICAL '09. IEEE International Conference on; Year: 2009; pp. 347-352, DOI: 10.1109/ICAL.2009.5262899.*

Nonlinear tire lateral force versus slip angle curve identification; Shiang-Lung Koo; Han-Shue Tan; Tomizuka, M.; American Control Conference, 2004. Proceedings of the 2004; Year: 2004, vol. 3; pp. 2128-2133 vol. 3.*

New Regressors for the Direct Identification of Tire Deformation in Road Vehicles Via "In-Tire" Accelerometers; Savaresi, S.M.; Tanelli, M.; Langthaler, P.; del Re, L.; Control Systems Technology, IEEE Transactions on; Year: 2008, vol. 16, Issue: 4 pp. 769-780, DOI: 10.1109/TCST.2007.912245.*

Algorithms for Real-Time Estimation of Individual Wheel Tire-Road Friction Coefficients; Rajesh Rajamani; Gridsada Phanomchoeng; Damrongrit Piyabongkarn; Jae Y. Lew; IEEE/ASME Transactions on Mechatronics Year: 2012, vol. 17, Issue: 6; pp. 1183-1195, DOI: 10.1109/TMECH.2011.2159240.*

Wear-optimal design: A tire wear model and sensitivity analysis; Hai-Bo Huang; Guo-Qiang Yu; Zhang Gang; 2010 International Conference on Computer, Mechatronics, Control and Electronic Engineering; Year: 2010, vol. 6; pp. 414-417, DOI: 10.1109/CMCE.2010.5609817.*

Extremum—Seeking Control of ABS Braking in Road Vehicles With Lateral Force Improvement; Erkin Dinçmen; Bilin Aksun Güvenç; Tankut Acarman; IEEE Transactions on Control Systems Technology; Year: 2014, vol. 22, Issue: 1; pp. 230-237, DOI: 10.1109/TCST.2012.2229465.*

Fuzzy sliding mode control of traction control system for electric scooter; Bo-Chiuan Chen; Chia-Hsing Chu; Shiuh-Jer Huang; 2010 Seventh International Conference on Fuzzy Systems and Knowledge Discovery; Year: 2010, vol. 2; pp. 691-695, DOI: 10.1109/FSKD.2010.5569400.*

Efficient Antilock Braking by Direct Maximization of Tire-Road Frictions; Reza Hoseinnezhad; Alireza Bab-Hadiashar ; IEEE Transactions on Industrial Electronics; Year: 2011, vol. 58, Issue: 8 ; pp. 3593-3600, DOI: 10.1109/TIE.2010.2081951.*

EPO Search Report received by Applicant on Apr. 21, 2016.

* cited by examiner

Dependency Levels

| Parameter | Load | Pressure | Speed | Wear State | Tire Temp |
|---|---|---|---|---|---|
| Braking Stiffness | High | Moderate | Moderate | High | High |
| Peak Grip | Moderate | Low | Moderate | Moderate | High |
| Optimal Slip-ratio | Moderate | Low | Moderate | High | High |
| Shape Factor | Low | Low | Low | Moderate | High |

High dependencies present opportunities for developing a prediction model for the optimal slip ratio point for improving the performance of vehicle brake control systems

FIG-3B

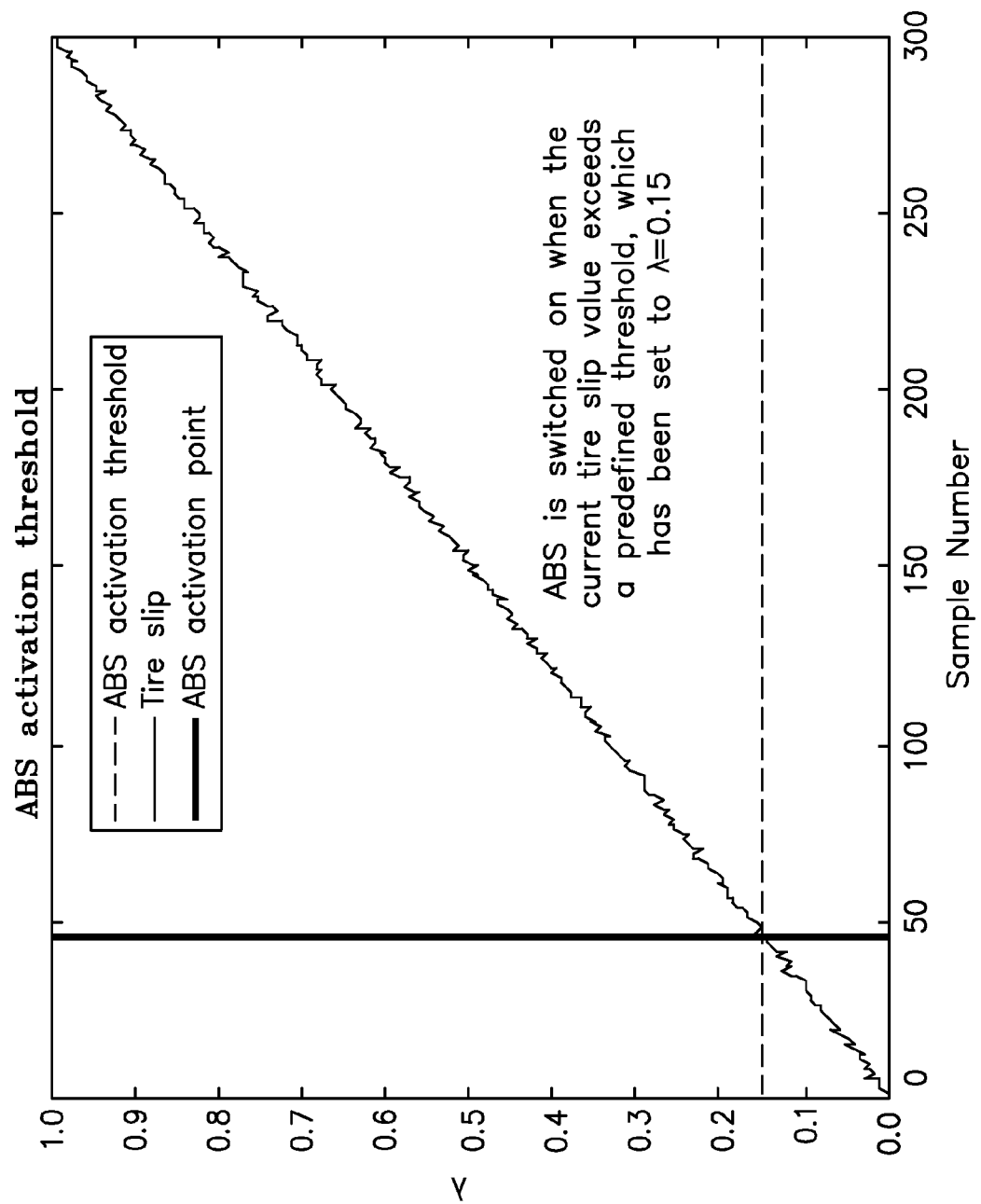

| Vertical Load (lbs) | Inflation Pressure (psi) | Tread Depth (mm) | Temperature (C°) | Optimal Slip (Actual) | Optimal Slip (Estimated) |
|---|---|---|---|---|---|
| 5824 | 41 | 2.38 | 26.667 | 0.047735 | 0.048955 |
| 6272 | 40 | 7.14 | 37.778 | 0.0664 | 0.0658 |
| 8064 | 34 | 7.14 | 0.556 | 0.037 | 0.0385 |
| 4480 | 34 | 7.14 | 1.11 | 0.045 | 0.0464 |

FIG-9

SLIP RATIO POINT OPTIMIZATION SYSTEM AND METHOD FOR VEHICLE CONTROL

FIELD OF THE INVENTION

The invention relates generally to tire monitoring systems for collecting measured tire parameter data during vehicle operation and, more particularly, to systems utilizing such tire sensor-based data in vehicle control systems.

BACKGROUND OF THE INVENTION

Current vehicle systems such as anti-lock braking systems require information about the slip ratio set point to maximize the braking force and consequentially minimize stopping distance. Typically such systems assume a fixed value for this optimal slip ratio so used. Assuming fixed values for the optimal slip ratio of each vehicle tire is, however, less than optimal and ignores that the optimal slip ratio for a given tire changes with operating conditions. Thus, current vehicle control systems that incorporate these optimal slip ratio assumptions operate less than at an optimal level. Accordingly, there remains a need for an accurate optimal slip ratio determination for vehicle tires and a system and method for the use of the improved optimal slip ratio estimate in vehicle control systems such as anti-lock braking systems.

SUMMARY OF THE INVENTION

In one aspect of the invention, a tire optimal slip ratio estimation system and method affixes a tire-identification device to a vehicle tire to provide a tire-specific identification and one or more sensors affixed to the tire for measuring one or more tire-specific parameters. A model-based optimal slip ratio estimator generates a model-derived tire optimal slip ratio from an assessment of sensor-derived tire-specific parameter information based upon the tire-specific identification.

In another aspect, the tire-specific parameter information includes a load estimation for the vehicle tire, temperature of the vehicle tire, air pressure within a cavity of the vehicle tire and a wear estimation for a tread region of the vehicle tire.

According to yet another aspect of the invention, the model-derived tire optimal slip ratio estimation is substantially continuously updated during an operation of the vehicle to reflect changes in the tire parameter measurements due to operating conditions such as temperature, pressure and wear rate and the updated model-derived optimal tire slip ratio estimation is operably utilized in at least one control system of the vehicle.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Dugoff Model" is an empirical tire model providing analytical relations for the longitudinal and lateral forces as functions of the slip angle and slip ratio. It accounts for the coupling between the side and longitudinal forces.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 3B is a table showing relationship between parameters and dependencies.

FIG. 5A is a graph showing current ABS system activation thresholding.

FIG. 9 is a table summarizing model performance comparing optimal slip (actual) to optimal slip (estimated) for selected variations in load, pressure, tread and tire temperature.

DETAILED DESCRIPTION OF THE INVENTION

Figure 1:
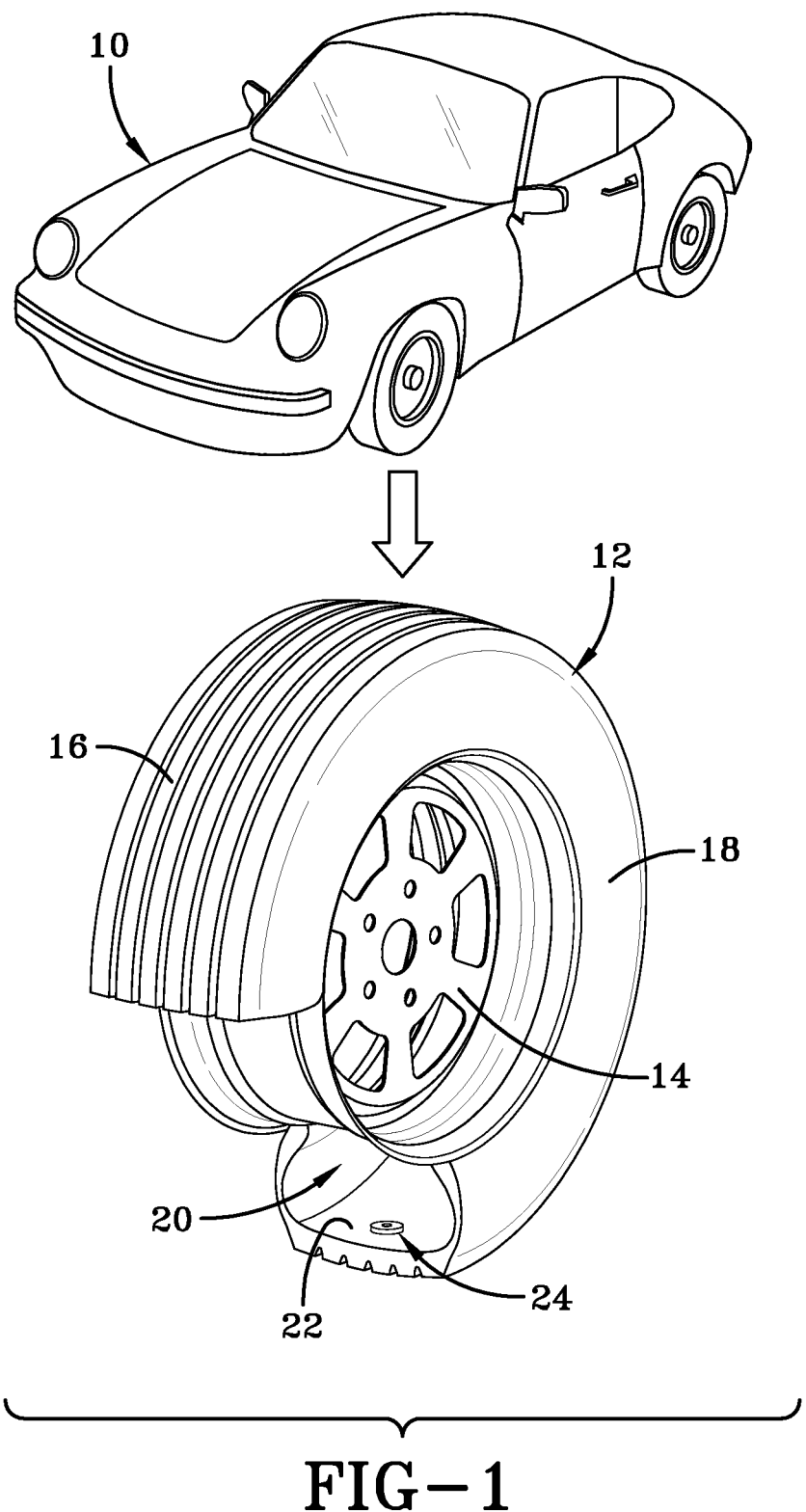
FIG. 1 is perspective view of a vehicle and partial sectioned tire forming components of the optimal slip ratio estimation system.

Referring to FIG. 1, a vehicle 10 is shown with an exemplary tire 12. The tire 12 is of conventional construction and is mounted to a wheel 14. The tire 12 has a tread region 16, sidewalls 18, a pressurized air cavity 20 defined by an inner liner 22. A sensor module (also referred herein as "device") 24 is mounted to the tire inner by suitable means such as adhesive. The sensor module 24 includes a pressure sensor for measuring the air pressure within cavity 20, a temperature sensor for measuring the tire temperature and a tire identification transponder programmed to provide a tire-specific identification. The module 24 is further equipped with telemetric transmission capability by which the temperature, pressure and identification information can be sent wirelessly to a remote receiver (not shown) for processing. The module sensors are commercially available and packaged and may be affixed to the inner liner through the use of commercially available adhesive.

Figure 2:
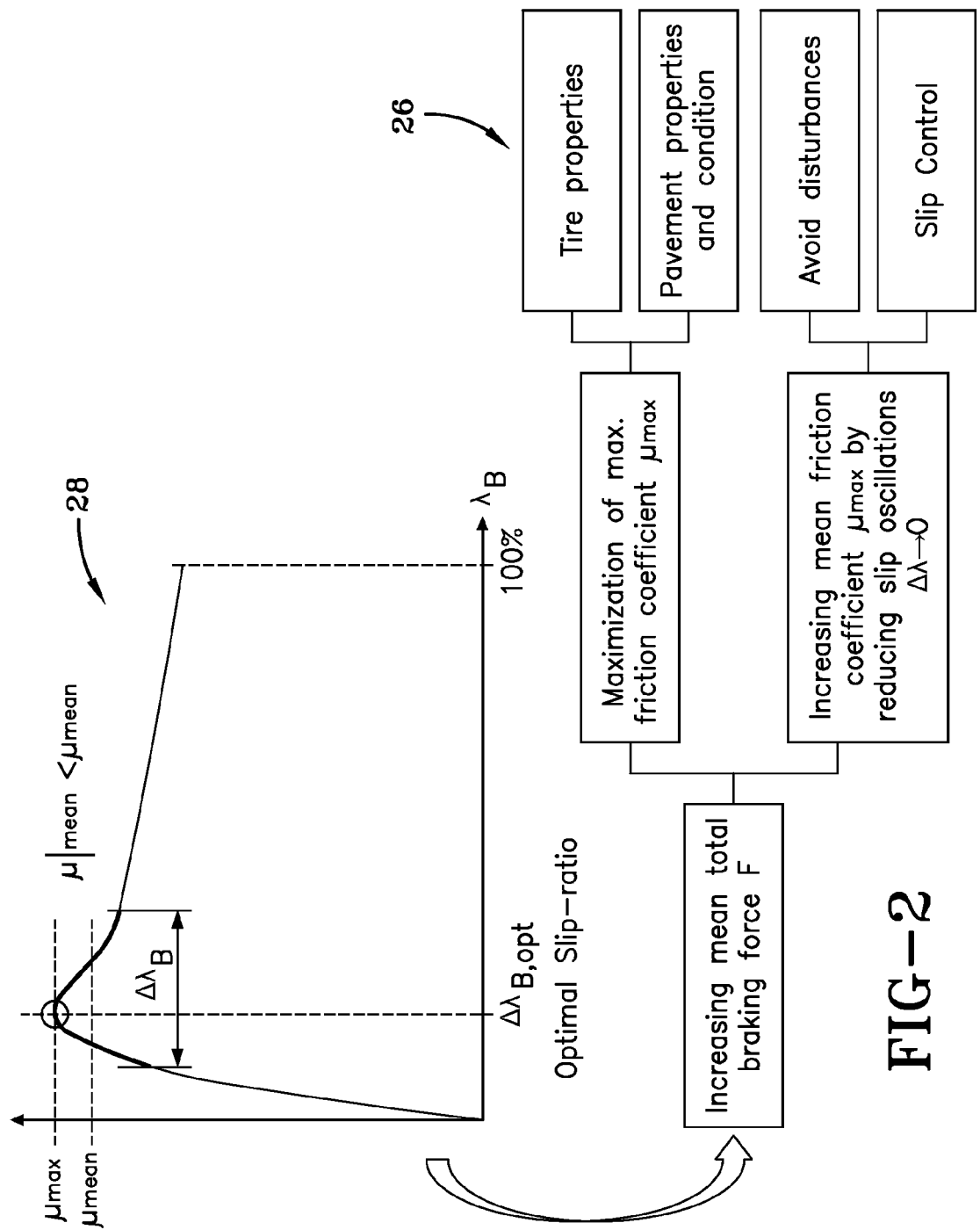
FIG. 2 is a graph of friction vs. slip ratio showing the optimal slip ratio at $\mu_{max}$. Options for increasing mean total braking force are identified in block diagram form.

With reference to FIG. 2, a graph 28 of friction vs. slip ratio is presented showing the optimal slip ratio at μmax. Options for increasing mean total braking force are identified in the blocks 26 beneath the graph. By way of background, an object of the subject system and method is to optimize the slip ratio operating point in order to maximize tire grip level. A knowledge of the optimal slip ratio point is achieved in order to assist rule-based control system controllers such as that used in anti-lock braking systems (ABS). Minimizing tire load oscillations is a further object in order to maximize the road holding capacity of each tire supporting the vehicle.

As summarized in FIG. 2, options for increasing mean total braking force are shown at blocks 26. Increasing mean total braking force F is achieved through maximization of the max friction coefficient $\mu_{max}$. The $\mu_{max}$ is affected by pavement properties and condition as well as tire properties. Increasing mean total braking force F is further influenced by increasing $\mu_{max}$ by reducing slip oscillations, $\Delta\lambda \rightarrow 0$. This is achieved by avoiding disturbances and/or slip control. The optimal slip ratio is identified in FIG. 2 at the peak where friction $\mu_{max}$ is maximized. As will be understood, optimizing the slip ratio ($\Delta\lambda \rightarrow 0$) occurs at the optimized (maximum) friction point.

Figure 3A:
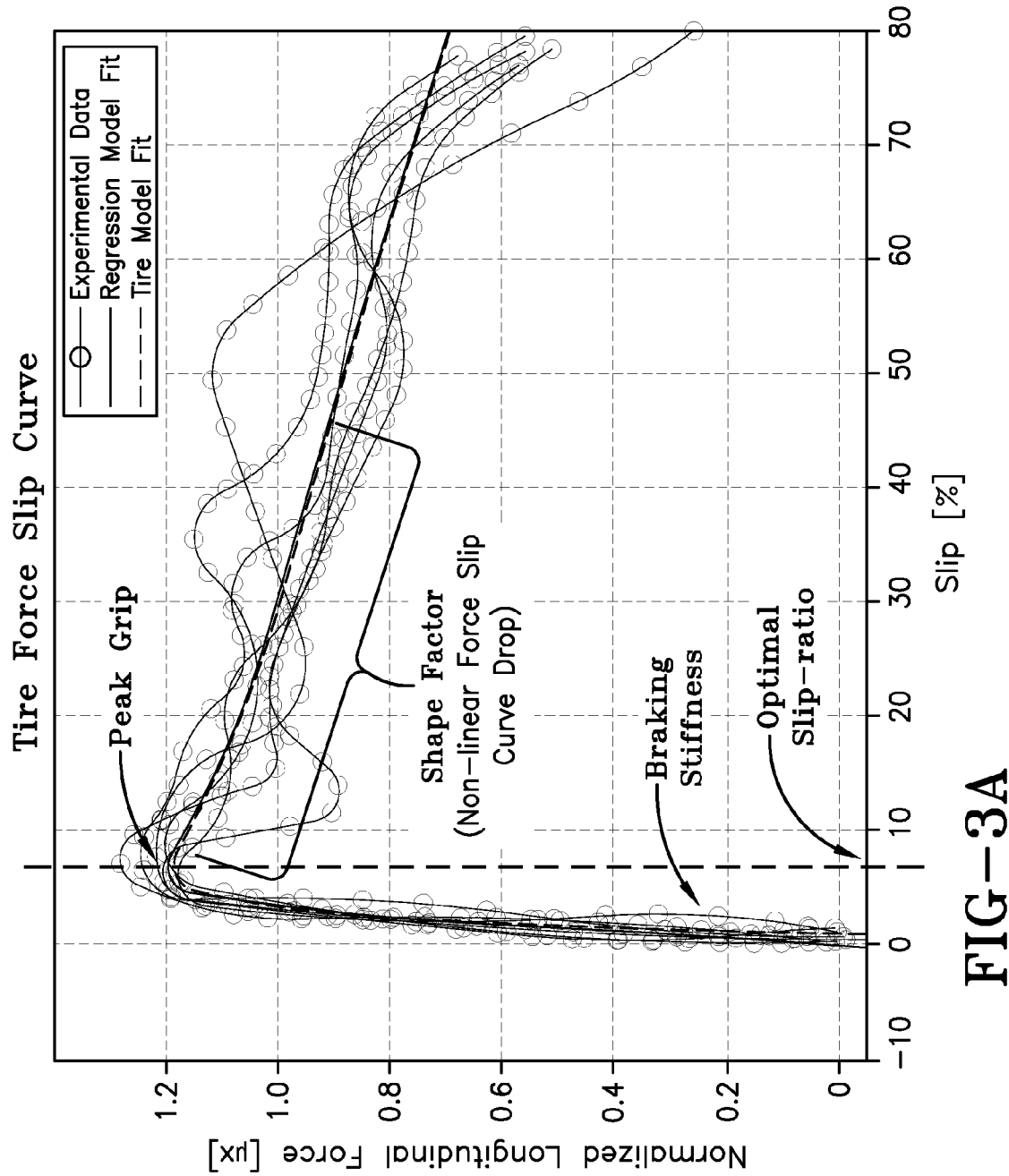
FIG. 3A is a tire force slip curve showing peak grip and optimal slip ratio points on the curve.

Sensitivity factors utilized by the subject system and method are used in achieving the above objective. In FIG. 3A, a tire force slip curve showing peak grip and optimal slip ratio points on the curve is shown. Experimental data, a regression model fit and a tire model fit are shown for comparison purposes. As seem from the table 30B braking stiffness, peak grip, optimal slip ratio and shape factor are affected to varying extents by the identified parameters: load on the tire, tire inflation pressure, vehicle speed, tire wear state and tire temperature. The subject system and method seeks to optimize slip ratio by consideration of the tire-based parameters load, pressure, wear state and tire temperature. The particularly high dependencies of slip ratio to wear state and tire temperature make their inclusion in a prediction model for the optimal slip ratio point beneficial. The achievement of the optimal slip ratio point that considers wear state and tire temperature makes improved performance of vehicle ABS possible.

Figure 4A:
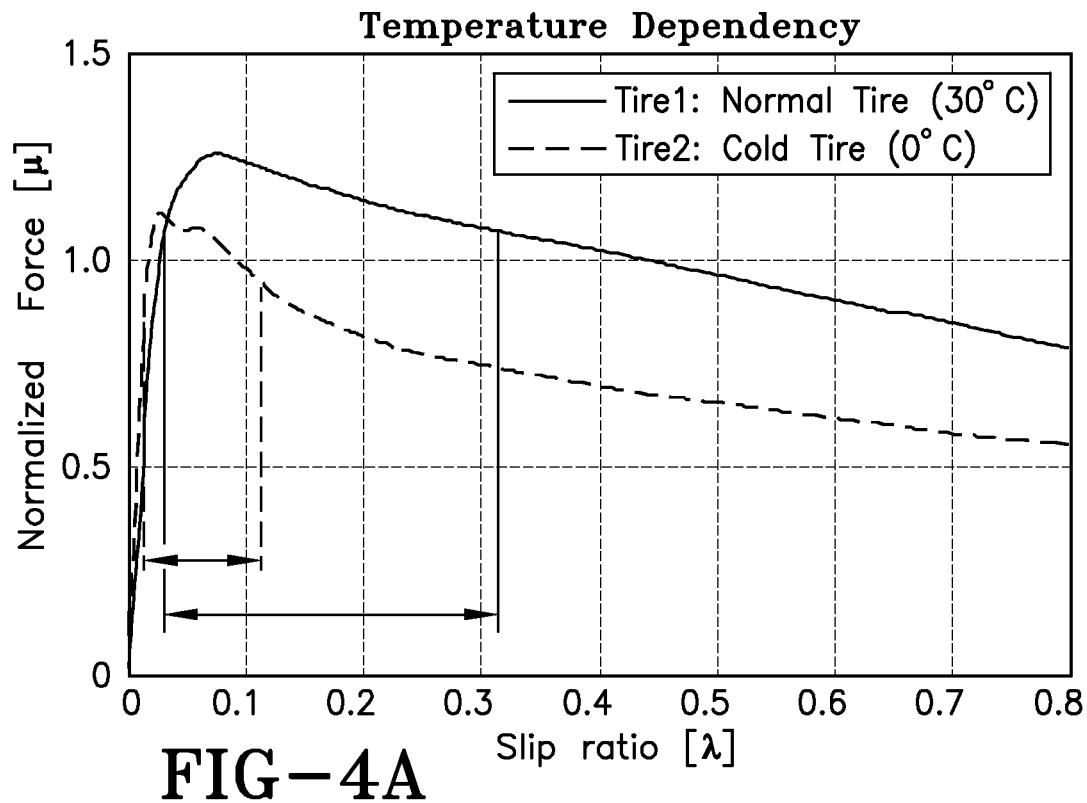
FIG. 4A is a tire force slip curve showing the temperature dependency of the optimal slip ratio point between a tire at normal temperature and a second tire at cold temperature.
Figure 4B:
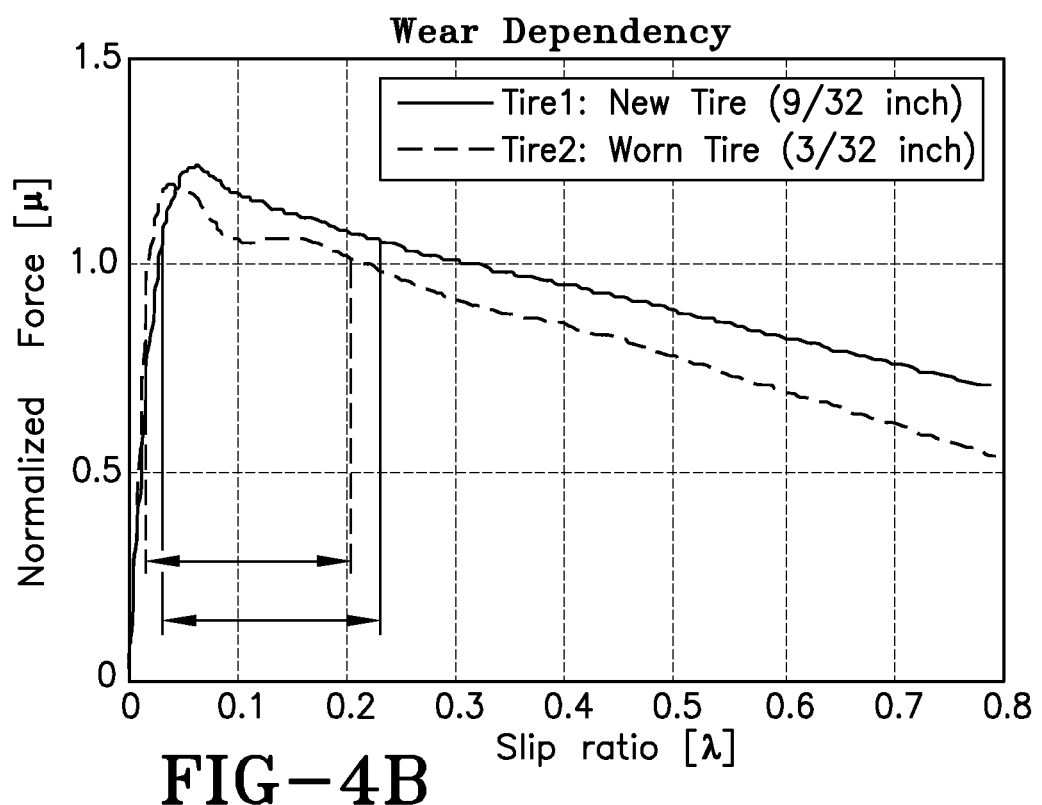
FIG. 4B is a tire force slip curve showing wear dependency.
Figure 4C:
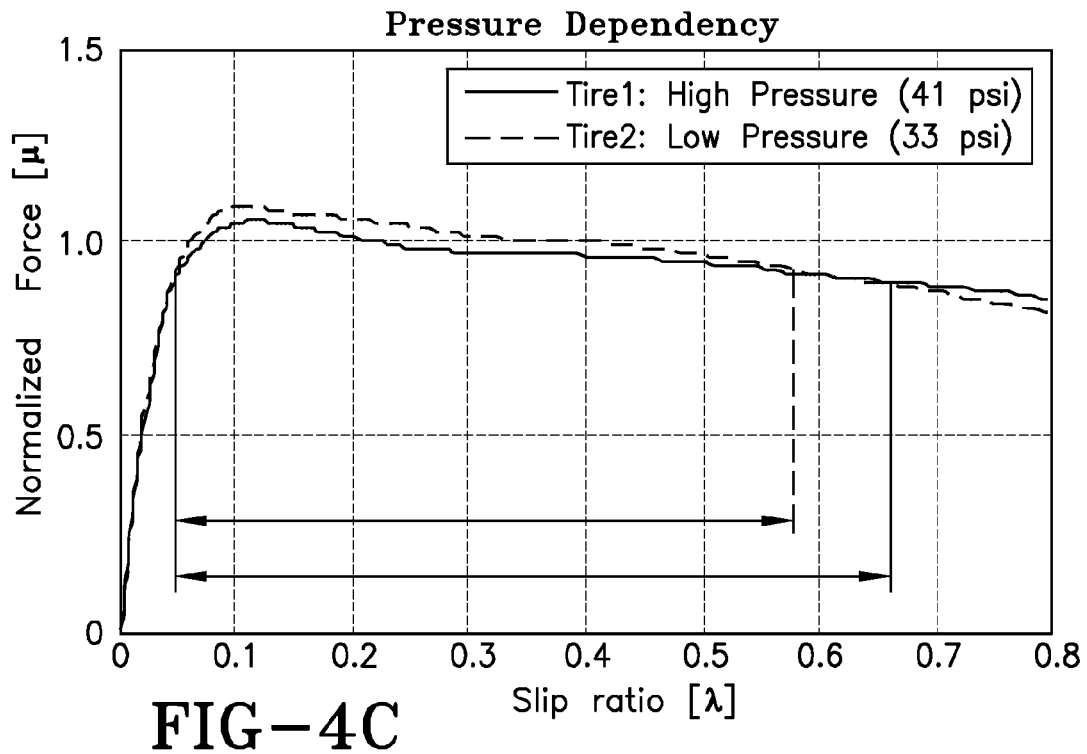
FIG. 4C is a tire force slip curve showing pressure dependency.
Figure 4D:
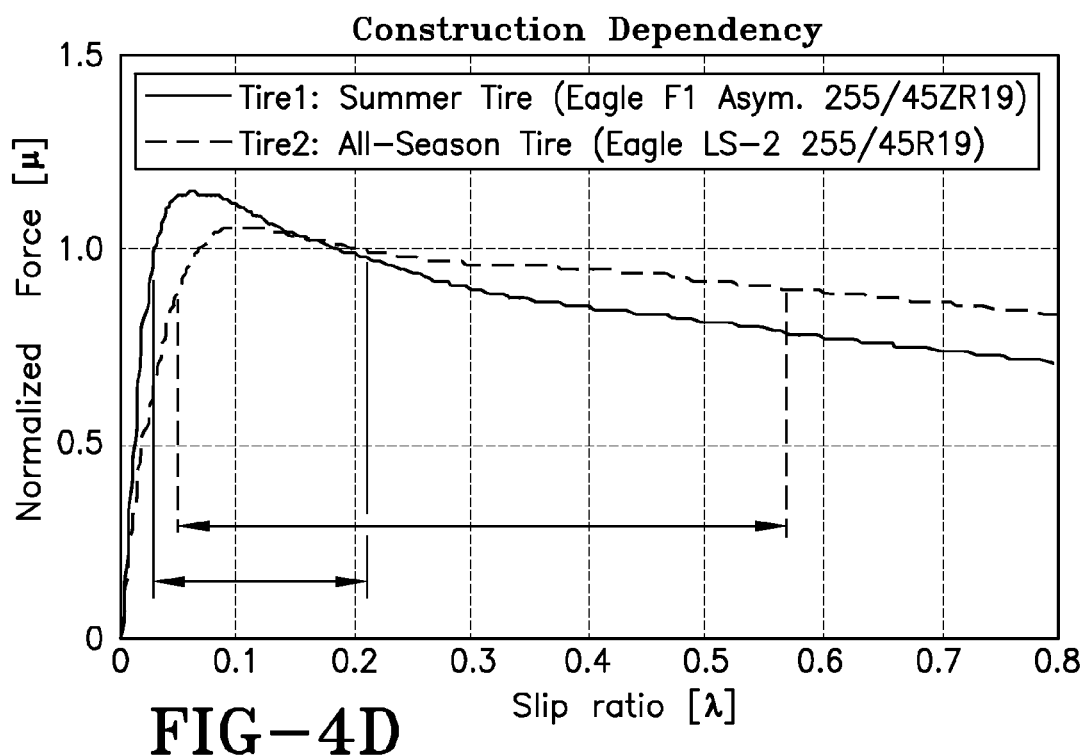
FIG. 4D is a tire force slip curve showing construction dependency.

Dependencies are more closely shown and are demonstrated by the experimental test result graphs of FIGS. 4A through 4D. In FIG. 4A, dependency of slip ratio to tire temperature is shown in the slip force curve. Tire 1 is at normal temperature (30° C.) while Tire 2 is a cold tire (0° C.). As compared to the normal tire, optimal slip ratio point changes in the cold tire by approximately 50 percent. In FIG. 4B, dependency of the optimum slip ratio from new tread condition (9/32 in.) to worn (3/32 in.) is seen to change by approximately 35 percent. In FIG. 4C, pressure dependency is seen with the optimum slip ratio changing marginally between a high pressure (41 psi) and a low pressure (33 psi) inflated tire. FIG. 4D shows construction dependency between a summer tire (Eagle F1 Asymmetric 255/45ZR19) and an all-season tire (Eagle LS-2 255/45R19). A change of approximately 90 percent is seen in the optimum slip ratio between the two tires.

In current ABS systems, a fixed value is assumed for the location of optimal slip ratio for use in their algorithms. However, as demonstrated in FIGS. 4A through 4D, optimal slip ratio for a given tire changes with operating conditions such as load, inflation pressure, temperature, and tread depth (wear state). Accurate knowledge of the optimal slip point based on tire ID and tire-sensed information (temperature, pressure, and tread wear) is used in the subject optimization of slip ratio point system and method to improve the performance of vehicle control systems such as the ABS.

Figure 5B:
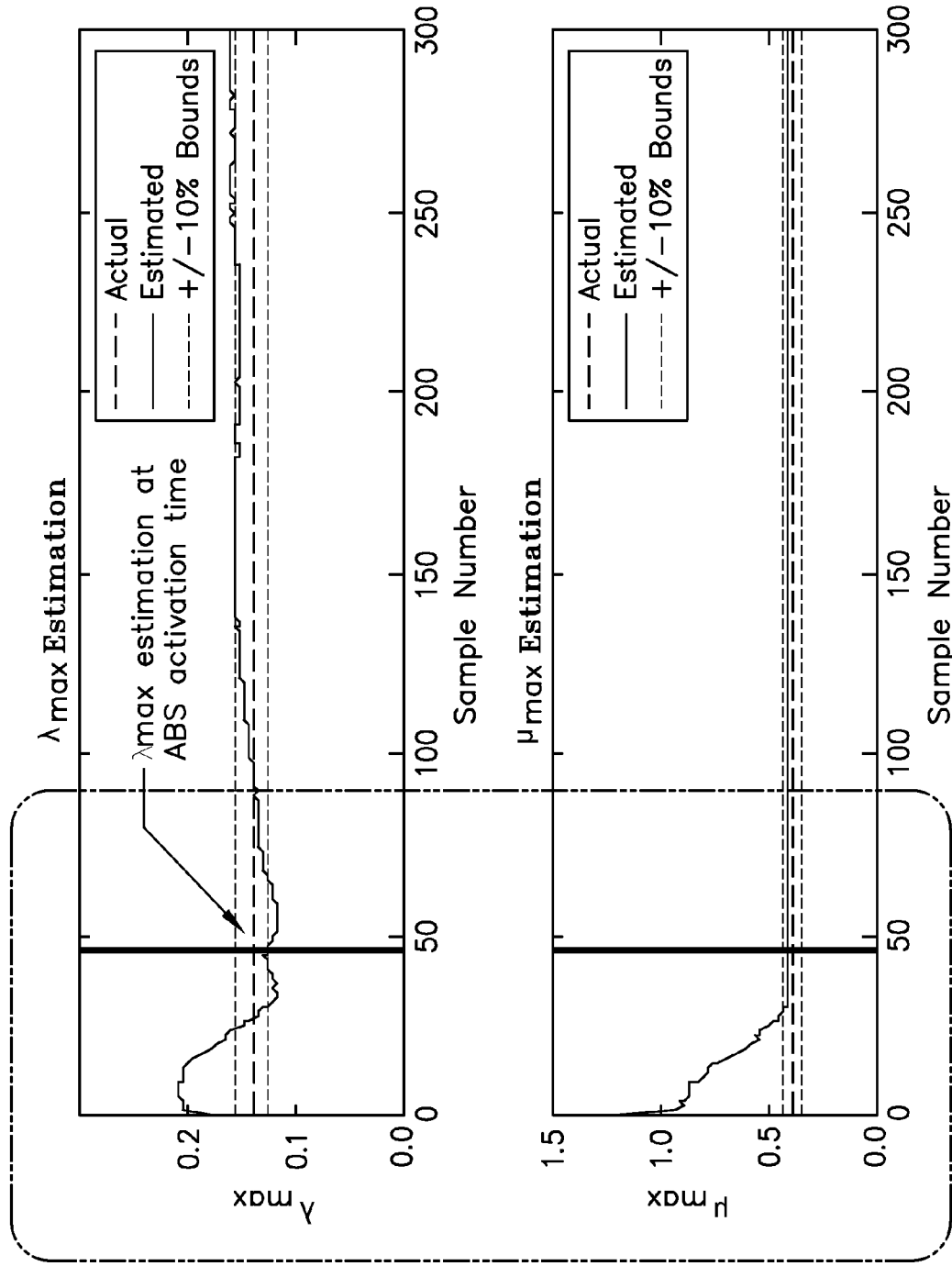
FIG. 5B are graphs of $\lambda_{max}$ and $\mu_{max}$ comparing actual to estimated with bounding of +/−10 percent.
Figure 6A:
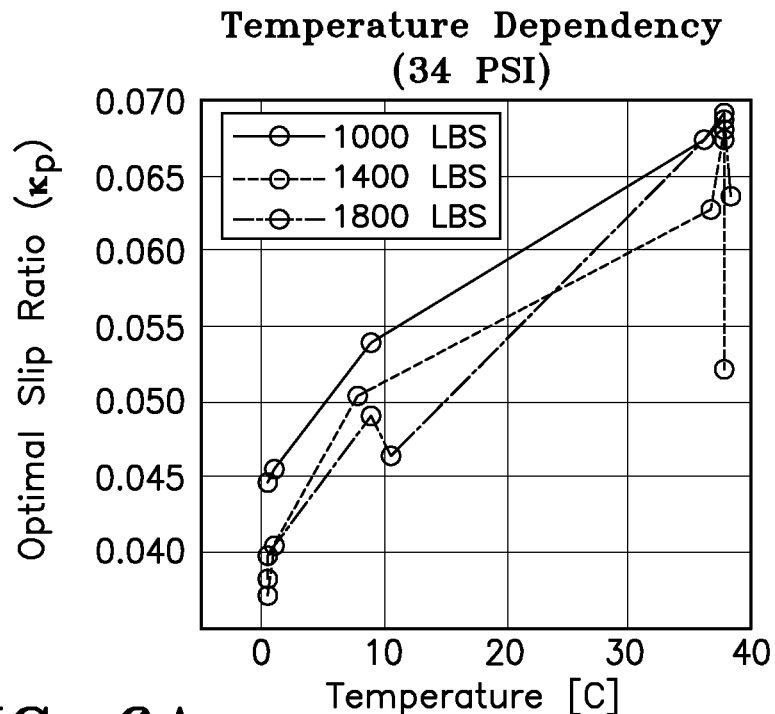
FIG. 6A is an optimal slip ratio graph showing temperature dependency under three load conditions.
Figure 6B:
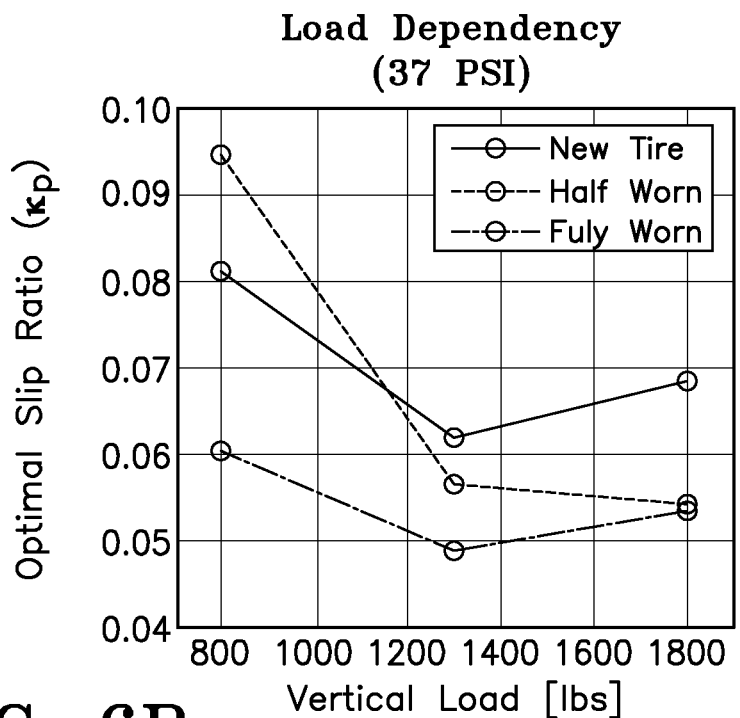
FIG. 6B is an optimal slip ratio graph showing load dependency under inflation pressure of 37 psi.
Figure 6C:
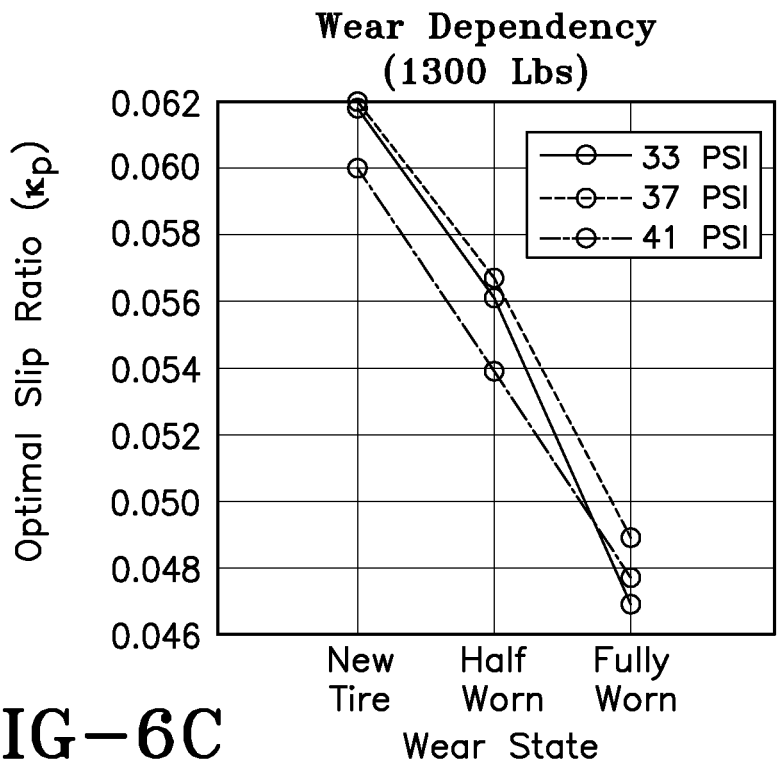
FIG. 6C is an optimal slip ratio graph showing wear dependency for three tire inflation pressures.
Figure 6D:
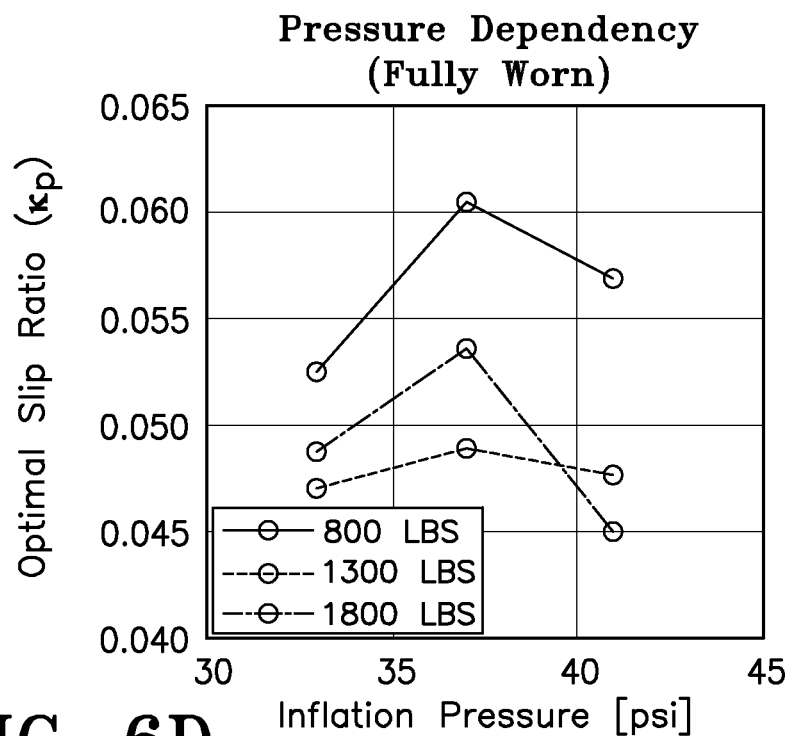
FIG. 6D is an optimal slip ratio graph showing pressure dependency for three loading conditions for a fully worn tire.

The system and method employed utilizes a model-based approach which is pre-calibrated through vehicle testing to enable lag-free estimation of optimal slip-ratio (slip estimation prior to ABS activation). The brake system can thus be adaptively pre-conditioned. In FIG. 5A, the ABS activation threshold, ABS, tire slip and ABS activation point are shown in the plot of λ vs. sample number. The ABS is switched on when the current tire slip value exceeds a predefined threshold which has been set to λ=0.15. FIG. 5B shows the plots of $\lambda_{max}$ and $\mu_{max}$ over the sampling. Actual, estimated and a bound of +/−10 percent is shown. As seen, the estimation of $\lambda_{max}$ is satisfactory, however, it is only reliable at the time instant at which the ABS would be activated. FIG. 5B shows the actual and estimated plots for $\mu_{max}$ estimation over the sampling. The variation of optimal slip ratio with various operating conditions is obtained from force slip curves generated from experiments. Further graphs showing dependencies between various operating conditions and their effect on the optimal slip ratio are shown in FIGS. 6A through 6D. FIG. 6A is an optimal slip ratio graph showing temperature dependency under three load conditions: 1000, 1400 and 1800 pounds. The tire is inflated to 34 psi. Three loading levels were tested: 1000, 1400 and 1800 pounds. The results indicate the optimal slip ratio point changes by approximately 50 percent as temperature changes between 0 and 40° C. In FIG. 6B, the dependency of the optimal slip ratio on load is seen at a tire inflation of 37 psi. The optimal slip ratio point changes by approximately 80 percent as the load is varied between 800 and 1800 pounds. Three wear states of tires, new, half worn and fully worn were tested, each yielding similar results. FIG. 6C demonstrates wear dependency. Three inflation pressures were tested at a load of 1300 pounds. The optimal slip ratio plotted against wear state (new, half worn, fully worn) indicate the optimal slip ratio point changes by approximately 35 percent between new and fully worn states. FIG. 6D shows pressure dependency in a fully worn tire under three loading levels: 800, 1300 and 1800 pounds. The optimal slip ratio point changes but only marginally between inflation levels of 33 and 42 psi.

Figure 7A:
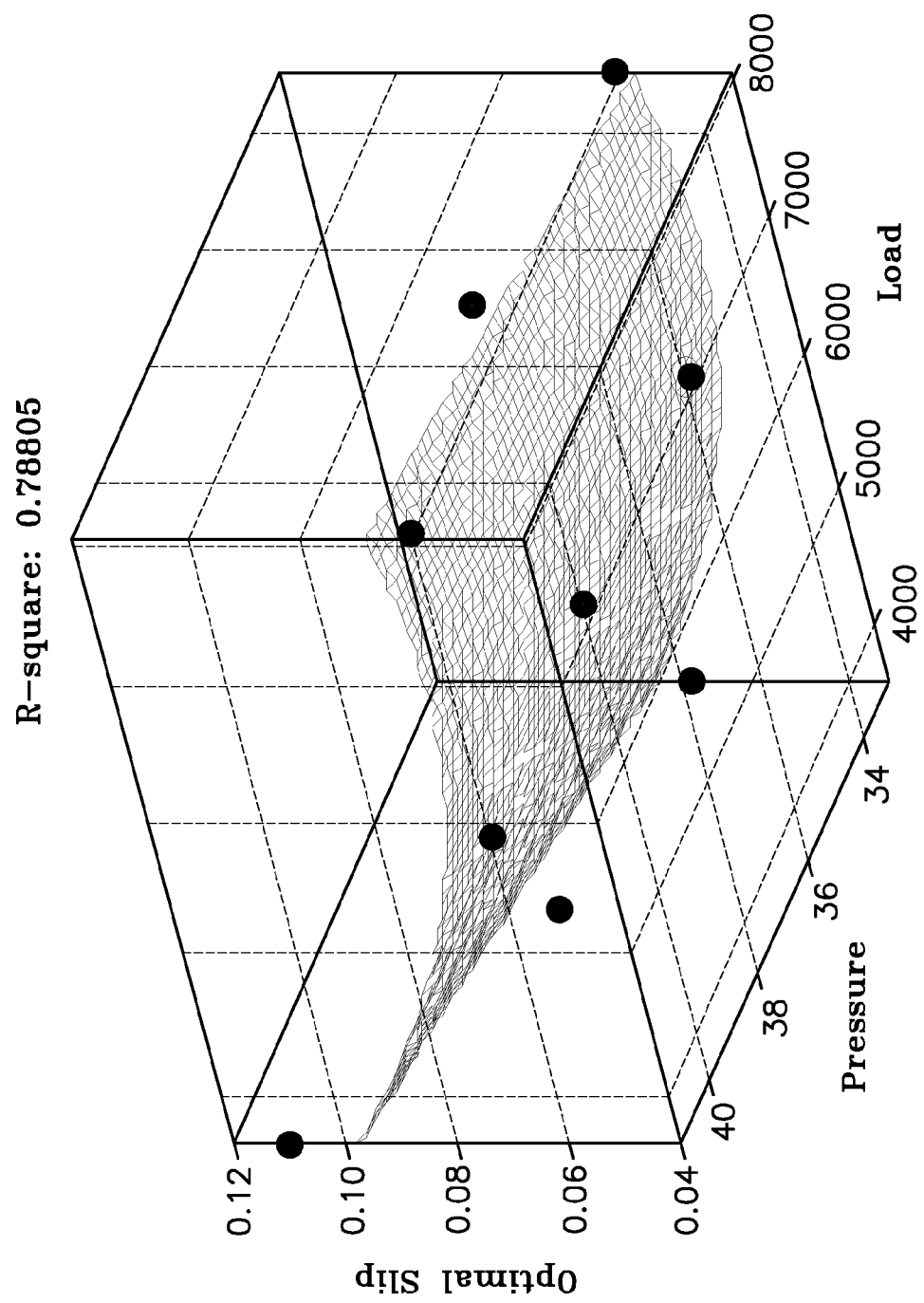
FIG. 7A is an optimal slip ratio graph to pressure and load showing curve fitting using experimental data.
Figure 7B:
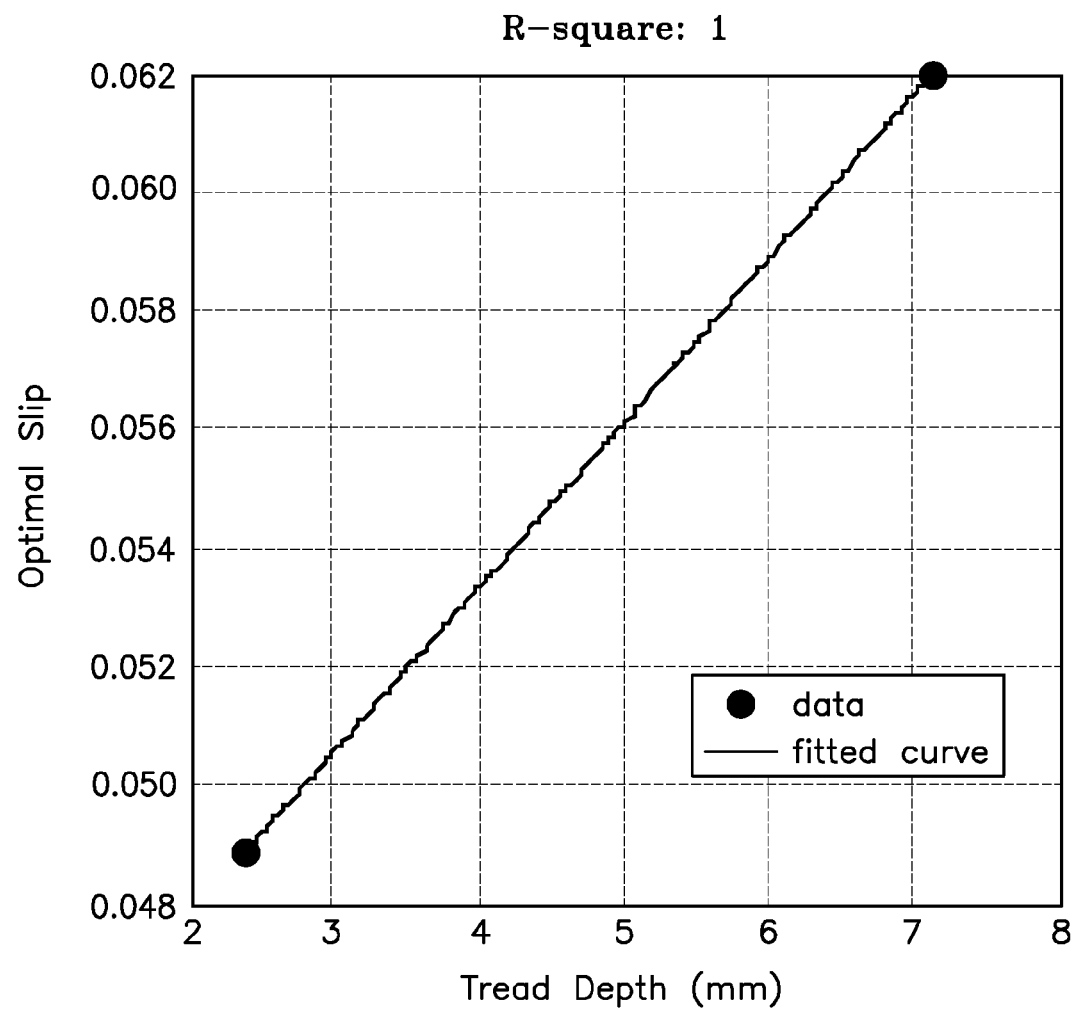
FIG. 7B is a graph of optimal slip ratio to tread depth showing a fitted curve vs. data comparison.
Figure 7C:
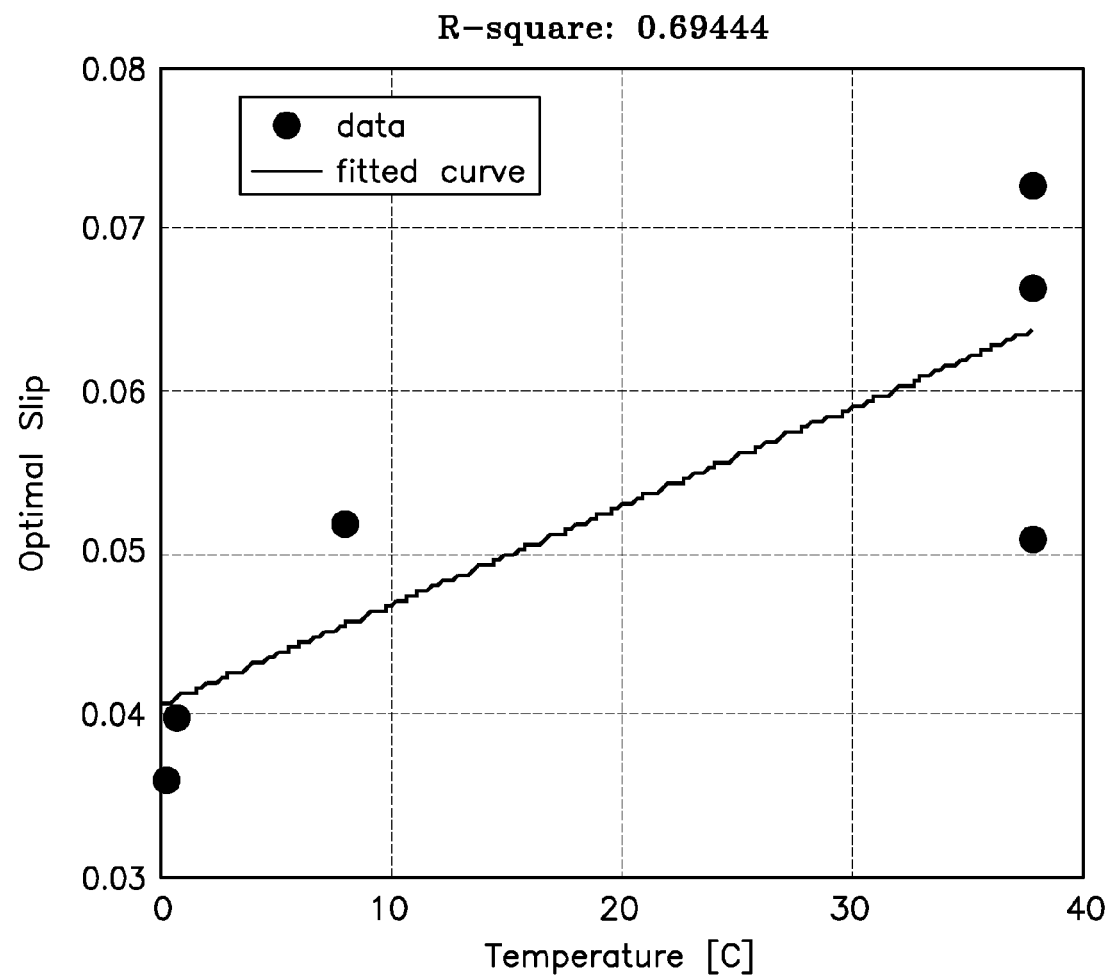
FIG. 7C is a graph of optimal slip ratio to temperature showing a fitted curve comparison.
Figure 8:
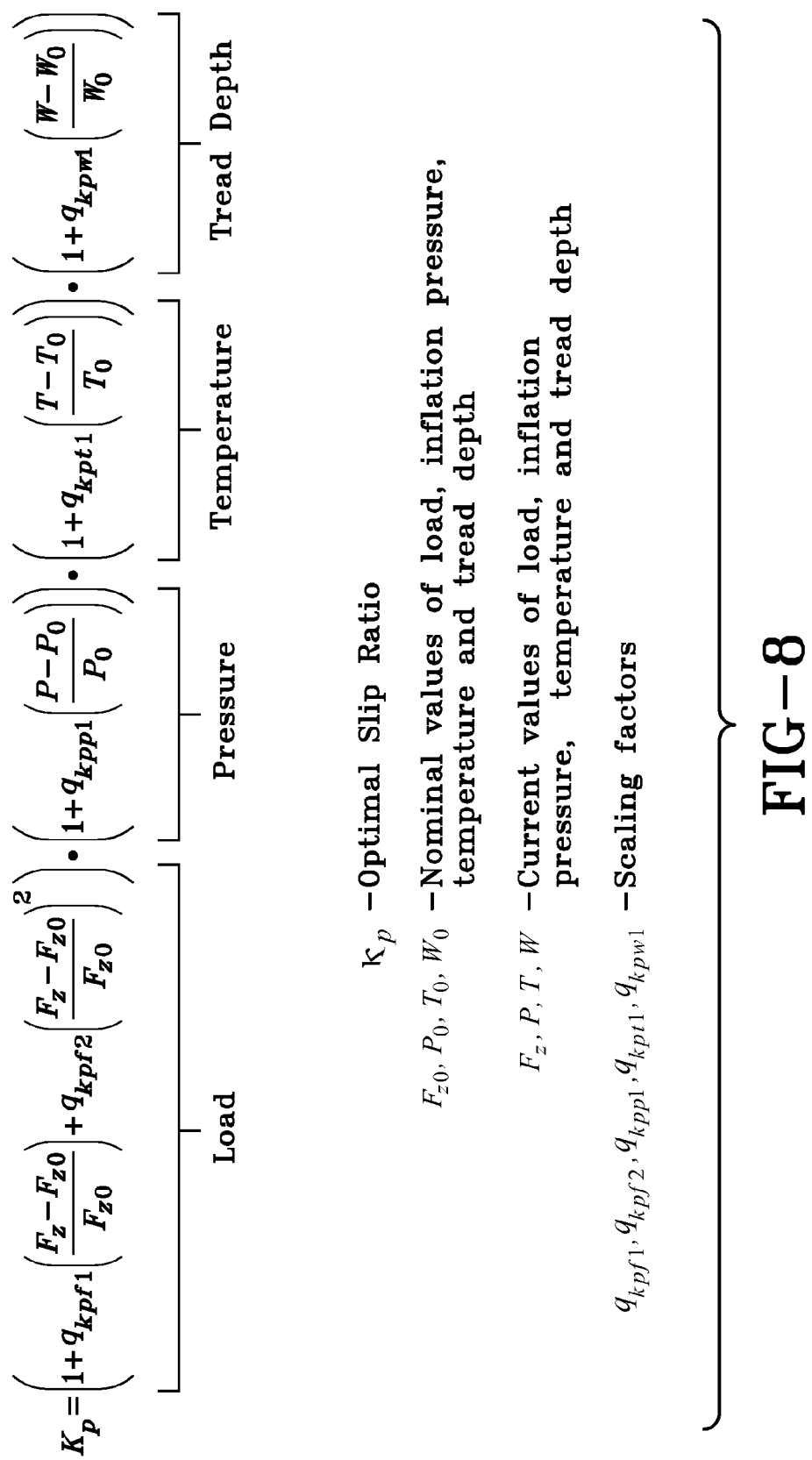
FIG. 8 is a representation of the optimal slip estimation model statement.

Scaling factors are calculated by the subject system and method based on a curve fitting routine using experimental data in a regression analysis, R-square:0.78805. Minimal cross-dependency is assumed between various operating conditions. In FIG. 7A, the optimal slip, pressure, load curve is shown as developed from experimental data. In FIG. 7B, R-square:1, the optimal slip to tread depth (mm) comparison plot shows data and fitted curve. FIG. 7C shows the optimal slip to temperature (C) comparison plots of data and fitted curve for R-square:0.69444. The expression for the subject optimal slip estimation model is shown in FIG. 8 with the definitional key therein. Solving for the optimal slip ratio is made by a processor receiving as inputs the tire-based sensor information (inflation pressure, temperature). Load is calculated based upon a dynamic tire load estimator configured as presented in co-pending U.S Patent Application Publication No. 2014/0278040, published Sep. 18, 2014, entitled VEHICLE DYNAMIC LOAD ESTIMATION SYSTEM AND METHOD hereby incorporated herein in its entirety. Tread depth or wear may be determined from an adaptive indirect tread wear such as the wear estimation method found in co-pending U.S. Application Ser. No. 13/917,691, filed Jun. 14, 2013, entitled TIRE WEAR STATE ESTIMATION SYSTEM AND METHOD, hereby incorporated by reference in its entirety herein. The wear estimation method of the co-pending application does so "indirectly", that is, without the use of tire mounted tread depth measuring sensors. As such, the difficulty of implementing and maintaining accurate tire-based sensor tread depth measurement is avoided. The indirect tire wear state estimation algorithm utilizes a hub acceleration signal which is accessible via the Vehicle CAN bus from vehicle based sensors. The hub acceleration signal is analyzed and an estimation is made as to tread depth or wear. The tread depth used may be the percentage tread wear left or a quantitative value of tread wear depth left on the tire.

Current values of inflation pressure, temperature and tread depth may be continuously updated by the tire-based sensors and the tread depth and load estimations identified above. Scaling factors are generated experimentally based upon tire construction. The tire ID obtained from the tire-based ID transponder allows the processor to identify the tire by type and use the appropriate scaling factors experimentally derived for that tire type. Thus, the model is pre-calibrated through vehicle testing which enables a lag-free, continuously updated, estimation of optimal slip ratio. This updated slip ratio may then be used in real time to pre-condition the brake system and ABS activation point. Improved performance of the ABS control system and reduced stopping distance is thereby achieved.

FIG. 9 shows in tabular form comparative test results between the optimal slip (actual) and the optimal slip (estimated) from use of the subject system and method. Inflation pressure, temperature and tread depth for the tests are as indicated. Good correlation was achieved throughout variations to tire temperature, tread depth, and inflation pressure.

In view of the foregoing, it will be appreciated that an accurate and robust optimal tire slip ratio estimation system and method has been achieved, facilitated through the affixation of a tire-identification device (transponder) to a vehicle tire to provide a tire-specific identification and one or more sensors (temperature, pressure) affixed to the tire for measuring one or more tire-specific parameters. A model-based optimal slip ratio estimator (FIG. 8) generates a model-derived optimal tire slip ratio estimation from an assessment of sensor-derived tire-specific parameter information (temperature, load, tread depth, pressure) based upon the tire-specific identification. Coefficients for the model are determined by a processor identification of the tire by construction type, enabled by tire ID obtained from the tire-based ID transponder. The model-derived optimal tire slip ratio estimation is substantially continuously updated during an operation of the vehicle to reflect changes in the tire parameter measurements and the updated model-derived optimal tire slip ratio estimation may then be utilized to assist control systems such as ABS to improve braking and reduce stopping distance.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An optimal tire slip ratio estimation system comprising:
a vehicle supported by at least one vehicle tire mounted to a hub, the vehicle tire having a tire cavity and a ground-engaging tread, and the tire having a plurality of tire-specific measureable parameters;
a tire-affixed tire-identification device for providing an electronic tire-specific identification;
a plurality of tire-affixed sensors mounted to the tire operably measuring the tire-specific parameters and generating tire-specific parameter information, the tire-specific parameter information including: a load estimation for the one vehicle tire, a measured temperature of the one vehicle tire, a measured air pressure within a cavity of the one vehicle tire, and a wear estimation for a tread region of the one vehicle tire; and
a model-based optimal slip ratio estimator operable to generate a model-derived optimal tire slip ratio estimation from an assessment of the tire-specific parameter information relative to the electronic tire-specific identification.

2. A method of making an optimal tire slip ratio estimation comprising:
mounting at least one vehicle tire to a vehicle, the vehicle tire having a tire cavity and a ground-engaging tread and the tire having a plurality of tire-specific measureable parameters;
affixing to the one vehicle tire a tire identification device providing an electronic tire-specific identification;
mounting a plurality of tire-affixed sensors to the tire operably measuring the tire-specific parameters to generate tire-specific parameter information;
inputting the tire-specific information into a model-based optimal slip ratio estimator; and
generating a model-derived optimal tire slip ratio estimation by the model-based optimal tire slip ratio estimator from an assessment of the tire-specific parameter information relative to the electronic tire-specific identification, wherein the tire-specific parameter information includes a load estimation for the one vehicle tire; a measured temperature of the one vehicle tire, a measured air pressure within a cavity of the one vehicle tire, and a wear estimation for a tread region of the one vehicle tire.

3. The method according to claim 2, further comprising substantially continuously updating the model-derived optimal tire slip ratio estimation during an operation of the vehicle to adjust for changes in the tire-specific information.

4. The method according to claim 3, further comprising using the updated optimal tire slip ratio estimation in at least one control system of the vehicle.

5. The method according to claim 2, further comprising utilizing a vehicle-based accelerometer signal to generate the load estimation for the one vehicle tire.

6. The optimal tire slip ratio estimation system of claim 1, wherein the model-derived optimal tire slip ratio estimation is substantially continuously updated during an operation of the vehicle.

7. The optimal tire slip ratio estimator according to claim 1, wherein the load estimation input into the model-based optimal tire slip ratio estimator operably calculates a load estimation based upon a vehicle-based hub accelerometer signal.

8. The optimal tire slip ratio estimation system of claim 6, wherein the updated model-derived optimal tire slip ratio estimation is operably utilized in at least one control system of the vehicle.

* * * * *